(12) United States Patent
Motohira et al.

(10) Patent No.: US 11,104,240 B2
(45) Date of Patent: Aug. 31, 2021

(54) ELECTRIFIED VEHICLE

(71) Applicant: Toyota Jidosha Kabushiki Kaisha, Toyota (JP)

(72) Inventors: Akito Motohira, Toyota (JP); Tomoya Ono, Toyota (JP); Yuya Aoki, Miyoshi (JP); Koichi Kojima, Toyota (JP); Takeshi Aridome, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/566,340

(22) Filed: Sep. 10, 2019

(65) Prior Publication Data

US 2020/0139837 A1     May 7, 2020

(30) Foreign Application Priority Data

Nov. 7, 2018   (JP) .............................. JP2018-209567

(51) Int. Cl.
| | |
|---|---|
| *B60L 53/60* | (2019.01) |
| *H01H 47/00* | (2006.01) |
| *B60L 50/60* | (2019.01) |
| *B60L 53/10* | (2019.01) |
| *B60L 53/14* | (2019.01) |
| *H02P 27/06* | (2006.01) |

(52) U.S. Cl.
CPC ............. *B60L 53/60* (2019.02); *B60L 50/60* (2019.02); *B60L 53/11* (2019.02); *B60L 53/14* (2019.02); *H01H 47/002* (2013.01); *H02P 27/06* (2013.01)

(58) Field of Classification Search
CPC .......... B60L 53/60; B60L 53/10; B60L 53/14; B60L 53/11; B60L 50/60; H01H 47/002; H01H 47/00

USPC ... 307/10.1, 10.2, 10.5, 10.7, 43, 38, 66, 64, 307/80, 82
See application file for complete search history.

(56) References Cited

U.S. PATENT DOCUMENTS

| | | | |
|---|---|---|---|
| 7,964,985 B2 * | 6/2011 | Ozaki | ..................... B60L 50/51 307/10.1 |
| 2009/0108674 A1 * | 4/2009 | Ozaki | ..................... B60L 50/16 307/10.6 |

(Continued)

FOREIGN PATENT DOCUMENTS

| | | |
|---|---|---|
| JP | 2016073110 A | 5/2016 |
| JP | 2016174468 A | 9/2016 |

*Primary Examiner* — Rexford N Barnie
*Assistant Examiner* — Jagdeep S Dhillon
(74) *Attorney, Agent, or Firm* — Dinsmore & Shohl LLP

(57) ABSTRACT

An electrified vehicle includes a system main relay attached to an electric power line for motive power and a charging relay attached to a charging electric power line through which a portion of the electric power line for motive power positioned between the system main relay and a drive circuit and a vehicle-side connection portion connected to a station-side connection portion of a direct current charging station are connected to each other. When the vehicle-side connection portion and the station-side connection portion are disconnected from each other while an electric storage device is being charged with electric power from the direct current charging station, diagnosis about double-pole welding abnormality of the charging relay is performed after the charging relay is turned off with the system main relay being in a turned-on state and the system main relay is turned off after the diagnosis.

2 Claims, 2 Drawing Sheets

(56) References Cited

U.S. PATENT DOCUMENTS

| | | | |
|---|---|---|---|
| 2013/0009598 A1* | 1/2013 | Ohtomo | H02J 7/0027 |
| | | | 320/109 |
| 2013/0268158 A1* | 10/2013 | Kurita | B60L 3/003 |
| | | | 701/32.8 |
| 2015/0375621 A1* | 12/2015 | Ono | B60L 50/16 |
| | | | 307/10.1 |
| 2016/0156258 A1* | 6/2016 | Yokoyama | H02M 1/00 |
| | | | 307/82 |
| 2016/0272070 A1* | 9/2016 | Kojima | B60L 53/11 |
| 2017/0015200 A1* | 1/2017 | Hatanaka | B60L 53/16 |

* cited by examiner

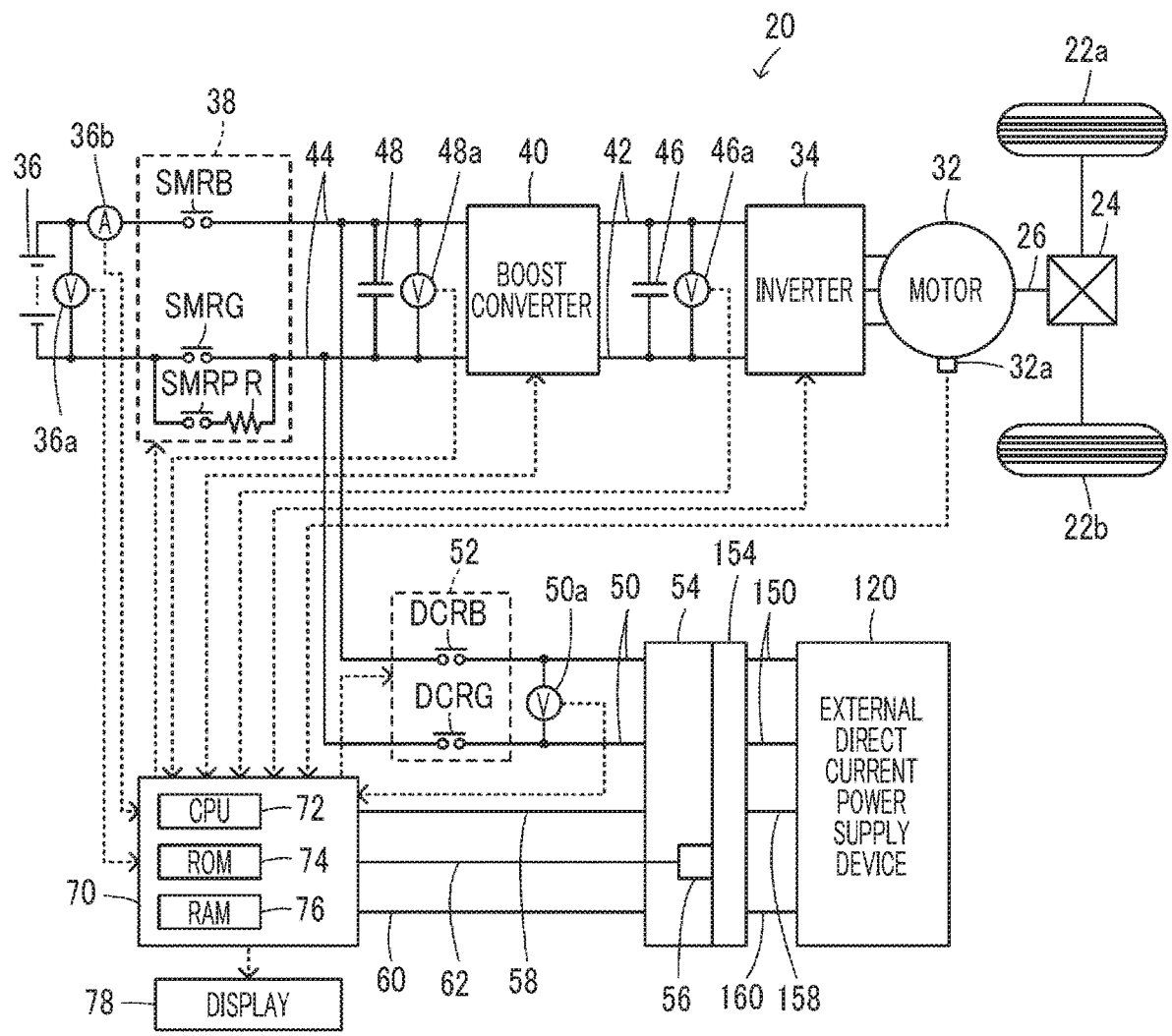

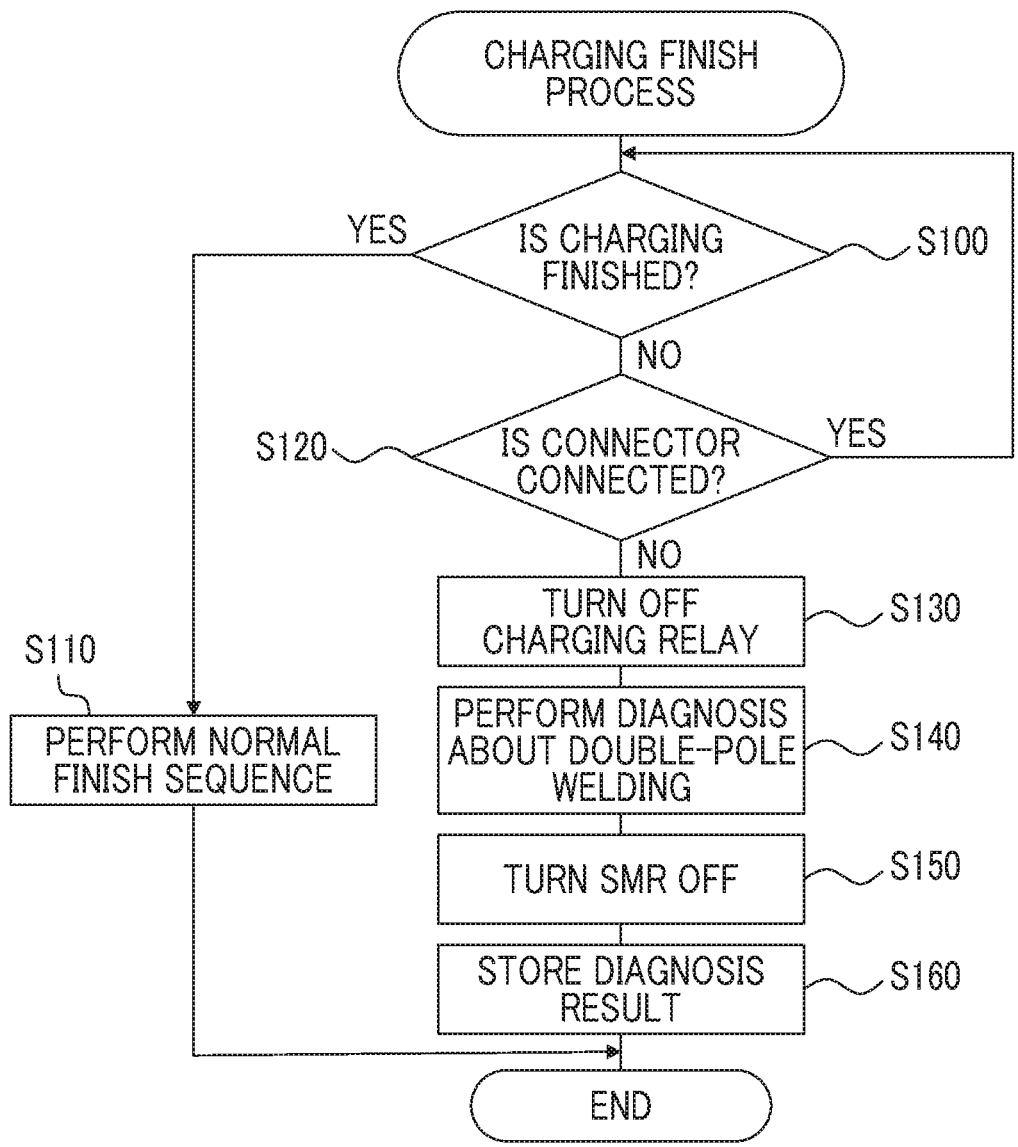

ELECTRIFIED VEHICLE

CROSS-REFERENCE TO RELATED APPLICATION

This application claims priority to Japanese Patent Application No. 2018-209567 filed on Nov. 7, 2018, the disclosure of which is incorporated herein by reference in its entirety.

BACKGROUND

1. Technical Field

The disclosure relates to an electrified vehicle. Specifically, the disclosure relates to an electrified vehicle in which an in-vehicle electric storage device is charged with electric power from a direct current charging station outside the vehicle.

2. Description of Related Art

In the related art, an electrified vehicle in which welding diagnosis fear a charging relay is performed after the charging of an electric storage device performed using electric power from a direct can cut charging station outside the vehicle is finished has been proposed as such an electrified vehicle (for example, refer to Japanese Unexamined Patent Application Publication No. 2016-073110 (JP 2016-073110 A)). In this vehicle, a station-side connector is removed from an inlet after charging is finished and the welding diagnosis for the charging relay is performed after a lid covering the inlet is closed.

SUMMARY

However, in the case of the welding diagnosis for the charging relay that is performed after the lid covering the inlet is closed, the welding diagnosis cannot be applied to a vehicle with no inlet lid. In addition, when it is not possible to detect that the lid is closed although the inlet is provided with a lid, it is not possible to perform the welding diagnosis for the charging relay. There is also a technique, in which connection between the station-side connector and the inlet is prompted in a case where it is not possible to perform the welding diagnosis for the charging relay and the welding diagnosis for the charging relay is performed after confirming that the connection between the station-side connector and the inlet has been made. However, when the opposite poles of the charging relay are welded, there is a possibility that a large electric current flows at the time of the connection between the station-side connector and the inlet and a machine is damaged.

An electrified vehicle according to an aspect of the disclosure more reliably performs welding diagnosis for the opposite poles of a charging relay when a station-side connection portion of a direct current charging station outside the vehicle and a vehicle-side connection portion are disconnected from each other during charging.

An electrified vehicle according to an aspect of the disclosure has adopted the following means.

An aspect of the disclosure relates to an electrified vehicle including an electric motor, a drive circuit, an electric storage device, a system main relay, a vehicle-side connection portion, a charging relay, and a control device. The electric motor is configured to output motive power for traveling. The drive circuit is configured to drive the electric motor. The system main relay is attached to an electric power line for motive power through which the electric storage device and the drive circuit are connected to each other. The vehicle-side connection portion is configured to be connected to a station-side connection portion of a direct current charging station outside the vehicle. The charging relay is attached to a charging electric power line through which a portion of the electric power line for motive power positioned between the system main relay and the drive circuit and the vehicle-side connection portion are connected to each other. The control device is configured to control the system main relay and the charging relay. When the vehicle-side connection portion and the station-side connection portion are disconnected from each other while the electric storage device is being charged with electric power from the direct current charging station, the control device turns the charging relay off with the system main relay being in a turned-on state to perform diagnosis about double-pole welding abnormality of the charging relay and turns the system main relay off after the diagnosis.

In the electrified vehicle, when the vehicle-side connection portion and the station-side connection portion are disconnected from each other while the electric storage device is being charged with electric power from the direct current charging station, the diagnosis about the double-pole welding abnormality of the charging relay is performed after the charging relay is turned off with the system main relay being in a turned-on state and the system main relay is turned off after the diagnosis. Accordingly, even when the vehicle-side connection portion and the station-side connection portion are unexpectedly disconnected from each other during the charging or even when the vehicle-side connection, portion and the station-side connection portion are intentionally disconnected from each other during the charging, it is possible to more reliably perform the diagnosis about the double-pole welding abnormality of the charging relay.

In the electrified vehicle according to the aspect of the disclosure, the control device may perform the diagnosis about the double-pole welding abnormality of the charging relay by using, a voltage of a portion of the charging electric power line positioned between the charging relay and the vehicle-side connection portion. Therefore, the control device may make a diagnosis that opposite poles of the charging relay have been welded when the voltage of a portion of the charging electric power line positioned between the charging relay and the vehicle-side connection portion is equal to or larger than a threshold value and make a diagnosis that opposite poles of the charging relay have not been welded when the voltage of a portion of the charging electric power line positioned between the charging relay and the vehicle-side connection portion is smaller than the threshold value. In this case, as the threshold value, a voltage lower than the output voltage of the electric storage device and higher than zero may be used.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein;

FIG. 1 is a configuration diagram illustrating a schematic configuration of an electric vehicle as an exemplary embodiment of the disclosure;

FIG. 2 is a flowchart illustrating an example of a charging finish process performed by an electronic control unit.

DETAILED DESCRIPTION

Next, an embodiment of the disclosure will be described by using an exemplary embodiment.

FIG. 1 is a configuration diagram illustrating a schematic configuration of an electric vehicle 20 as an exemplary embodiment of the disclosure. As shown in the drawing, the electric vehicle 20 in the exemplary embodiment is provided with a motor 32, an inverter 34, a battery 36, a boost converter 40, a high-voltage side electric power line 42, a low-voltage side electric power line 44, a system main relay 38, a charging electric power line 50, a vehicle-side inlet 54, and an electronic control unit 70.

The motor 32 is configured as a synchronous generator motor and is provided with a rotor in which a permanent magnet is buried and a stator on which a three-phase coil is wound. The rotor of the motor 32 is connected to a drive shaft 26 which is linked to drive wheels 22a, 22b via a differential gear 24.

The inverter 34 is connected to the motor 32 and to the high-voltage side electric power line 42. The inverter 34 is configured as a known inverter circuit that has six transistors and six diodes.

The battery 36 is configured as a lithium-ion secondary battery or a nickel-hydrogen secondary battery and is connected to the low-voltage side electric power line 44.

The boost converter 40 is connected to the high-voltage side electric power line 42 and the low-voltage side electric power line 44 and is configured as a known step-up/down converter circuit that has two transistors, two diodes, and a reactor.

A high-voltage side capacitor 46 is connected to a positive pole bus bar and a negative pole bus bar of the high-voltage side electric power line 42 and a low-voltage side capacitor 48 is attached to a positive pole bus bar and a negative pole bus bar of the low-voltage side electric power line 44. The system main relay 38 is attached to low-voltage side electric power line 44. The system main relay 38 includes a positive pole-side relay SMRB provided for the positive pole bus bar of the low-voltage side electric power line 44, a negative pole-side relay SMRG provided for the negative pole bus bar of the low-voltage side electric power line 44, and a pre-charge circuit in which a pre-charge resistor R and a pre-charge relay SMRP are connected in series such that the negative pole-side relay SMRG is bypassed.

A first end of the charging electric power line 50 is connected to a portion of the low-voltage side electric power line 44 that is closer to the boost converter 40 side (motor 32 side) than the system main relay 38 side and a second end of the charging electric power line 50 is connected to the vehicle-side inlet 54. A charging relay 52 is attached to the charging electric power line 50. The charging relay 52 includes a positive pole-side relay DCRB provided for a positive pole-side line of the charging electric power line 50 and a negative pole-side relay DCRG provided for a negative pole-side line of the charging electric power line 50. The charging electric power line 50 is connected to an external charging electric power line 150 from an external direct current power supply device 120 when an external connector 154 of the external direct current power supply device 120 is connected to the vehicle-side inlet 54. Although not shown, the external direct current power supply device 120 is connected to an external commercial power source, the electric power from the commercial power source is converted into direct current electric power, and the direct current electric power is supplied through the external charging electric power line 150.

A connection line 58 and a communication line 60 are connected to the vehicle-side inlet 54. When the external connector 154 is connected to the vehicle-side inlet 54, the connection line 58 is connected to an external connection line 158 of the external direct current power supply device 120 via the external connector 154 and when the external connector 154 is connected to the vehicle-side inlet 54, the communication line 60 is connected to an external communication line 160 connected to the external direct current power supply device 120, via the external connector 154.

The electronic control unit 70 is configured as a microprocessor including a CPU 72 as a main component and is provided with a ROM 74 storing a processing program, a RAM 76 temporarily storing data, a flash memory (not shown), input and output ports (not shown), and a communication port (not shown) in addition to the CPU 72.

Signals from various sensors are input to the electronic control unit 70 via an input port. Examples of the signals input to the electronic control unit 70 include a rotation position $\theta m$ from a rotation position detecting sensor (for example, resolver) 32a that detects the rotation position of the rotor of the motor 32, a voltage VB from a voltage sensor 36a attached between terminals of the battery 36, and an electric current I13 from an electric current sensor 36b attached to an output terminal of the battery 36. In addition, examples of the signals input to the electronic control unit 70 also include a voltage VH of the high-voltage side capacitor 46 (high-voltage side electric power line 42) from a voltage sensor 46a attached between terminals of the high-voltage side capacitor 46 and a voltage VL of the low-voltage side capacitor 48 (low-voltage side electric power line 44) from a voltage sensor 48a attached between terminals of the low-voltage side capacitor 48. A charging voltage Vchg from a voltage sensor 50a attached to the charging electric power line 50 is also input in addition, the connection line 58 connected to the vehicle-side inlet 54 and a lid signal line 62 from a lid sensor 56 attached to the vehicle-side inlet 54 are connected to the input port of the electronic control unit 70. Note that, information needed for traveling control is also input to the electronic control unit 70 such that the electronic control unit 70 functions as a vehicle drive control device as well. Although not shown, examples of the information include an ignition signal from an ignition switch, a shift position from a shift position sensor detecting the operation position of a shift lever, an accelerator operation amount from an accelerator position sensor that detects the stepping-on amount of accelerator pedal, a brake pedal position from a brake pedal position sensor that detects the stepping-on amount of a brake pedal, and a vehicle speed from a vehicle speed sensor.

From the electronic control unit 70, various control signals are output through the output port. Examples of the signals output from the electronic control unit 70 include a switching control signal to the transistors of the inverter 34, a switching control signal to the transistors of the boost converter 40, a drive control signal to the system main relay 38, a drive control signal, to the charging relay 52, and a display signal to a display 78 disposed in an installation panel in front of a driver's seat.

The electronic control unit 70 communicates with the external direct current power supply device 120 when the communication line 60 connected to the communication port is connected to the external communication line 160.

Next, an operation of the electric vehicle 20 in the exemplary embodiment configured as described, particularly an operation that is performed when the external connector 154 and the vehicle-side inlet 54 are disconnected from each other while the battery 36 is being charged with electric power from the external direct current power supply device 120, will be described. FIG. 2 is a flowchart illustrating an example of a charging finish process performed by the electronic control unit 70. This routine is performed when charging with electric power from the external direct current power supply device 120 is started.

When the charging finish process is performed, first, the electronic control unit 70 determines whether the charging is finished or not (step S100). Here, the determination on whether the charging is finished or not in step S100 is determination on whether the charging is finished normally with the battery 36 being fully charged or not. When the electronic control unit 70 determines that the charging is not finished normally, determination on whether the external connector 154 is connected to the vehicle-side inlet 54 is made (step S120). This determination can be performed based on determination on whether the connection line 58 connected to the vehicle-side inlet 54 is connected to the external connection line 158 connected to the external, connector 154 or not. When a determination is made that the external connector 154 is connected to the vehicle-side inlet 54, the process returns to the determination in step S100 which is determination on whether the charging is finished normally Therefore, when the external connector 154 remains connected to the vehicle-side inlet 54 until the charging is finished normally, the processes in steps S100 and S120 are repeatedly performed.

When the electronic control unit 70 determines that the charging is finished normally in step S100, a normal finish sequence is performed (step S110) and the process is terminated. Examples of the normal finish sequence include a sequence of performing diagnosis about welding abnormality of the positive pole-side relay DCRB or the negative pole-side relay DCRG while turning the positive pole-side relay DCRB or the negative pole-side relay DCRG of the charging relay 52 on and off with the system main relay 38 being in a turned-on state storing the result of the diagnosis, and turning the charging relay 52 and the system main relay 38 off.

When the vehicle-side inlet 54 and the external connector 154 are disconnected from each other before the charging is finished normally, the result of the determination in step S120 becomes negative and the process is terminated after a finish sequence of steps S130 to S160 is performed. Examples of a case where the vehicle-side inlet 54 and the external connector 154 are disconnected from each other before the charging is finished normally include a ease where the external connector 154 is unexpectedly removed from the vehicle-side inlet 54 and a case where the external connector 154 is removed from the vehicle-side inlet 54 such that the charging is finished forcibly.

In the finish sequence that is performed when the result of the determination in step S120 is negative, first, the charging relay 52 is immediately turned off (step S130) such that supply of electric power from the battery 36 side to the vehicle-side inlet 54 is suppressed. Next, diagnosis about double-pole welding abnormality of the charging relay 52 is performed (step S140). The diagnosis about double-pole welding abnormality of the charging relay 52 can be performed by checking the charging voltage Vchg from the voltage sensor 50a. That is, when there is double-pole welding abnormality where both of the positive pole-side relay DCRB and the negative pole-side relay DCRG of the charging relay 52 are welded, the charging voltage Vchg becomes a value equal to or close to the voltage VB from the voltage sensor 36a since an output voltage from the battery 36 acts and when there is no double-pole welding abnormality, the charging voltage Vchg becomes zero or a value close to zero. Therefore, it is possible to make a diagnosis that there is double-pole welding abnormality when the charging voltage Vchg from the voltage sensor 50a is larger than a threshold value that is set to a value smaller than the output voltage VB of the battery 36 in advance and to make a diagnosis that there is no double-pole welding abnormality when the charging voltage Vchg is smaller than the threshold value. When the diagnosis about the double-pole welding abnormality of the charging relay 52 as described above is finished, the system main relay 38 is turned off (step S150), the result of the diagnosis about the double-pole welding abnormality of the charging relay 52 is stored (step S160), and the sequence is terminated. Since the sequence as described above is performed, even when the charging is not finished normally, it is possible to perform the diagnosis about the double-polo welding abnormality of the charging relay 52.

In the electric vehicle 20 according to the exemplary embodiment, in a case where the external connector 154 is unexpectedly removed from the vehicle-side inlet 54 or in a case where the external connector 154 is removed from the vehicle-side inlet 54 such that the charging is forcibly finished, the finish sequence, in which the charging relay 52 is turned off, the diagnosis about the double-pole welding abnormality of the charging relay 52 is performed with the system main relay 38 being in the turned-on state, and the system main relay 38 is turned off after the diagnosis, is performed. Accordingly, even when the charging is not finished normally, the diagnosis about the double-pole welding abnormality of the charging relay 52 can be performed. As a result, it is possible to more reliably perform the diagnosis about the double-pole welding abnormality of the charging relay 52 when the external connector 154 of the external direct current power supply device 120 and the vehicle-side inlet 54 are disconnected from each other during the charging. In the first place, when the charging is finished normally, diagnosis about welding abnormality of each pole of the charging relay 52 is performed.

In the electric vehicle 20 according to the exemplary embodiment, the battery 36 is used as an electric storage device. However, the electric storage device may be any device capable of storing electric power and a capacitor or the like may also be used. The electric vehicle 20 in the exemplary embodiment is provided with the boost converter 40. However, the electric vehicle 20 may not be provided with the boost converter 40.

In the exemplary embodiment, the electric vehicle 20 is provided with the motor 32. However, the vehicle may be a hybrid vehicle provided with an engine in addition to the motor 32 and may be a vehicle in which a fuel cell is installed.

A correspondence relationship between main elements in the exemplary embodiment and main elements in described in SUMMARY will be described. In the exemplary embodiment, the motor 32 corresponds to an "electric motor", the boost converter 40 or the inverter 34 corresponds to a "drive circuit", the battery 36 corresponds to an "electric storage device", the system main relay 35 corresponds to a "system main relay", the vehicle-side inlet 54 corresponds to a "vehicle-side connection portion", the charging relay 52 corresponds to a "charging relay", and the electronic control unit 70 corresponds to a "control device".

Since the exemplary embodiment is an example for specifically describing the embodiment of the disclosure described in SUMMARY, the correspondence relationship between the main elements in the exemplary embodiment and the main elements described in SUMMARY is not intended to limit the elements according to an aspect of the disclosure described in SUMMARY. That is, interpretation with respect to the disclosure described in SUMMARY is to be performed based on the description in SUMMARY and the exemplary embodiment is merely a specific example of the disclosure described in SUMMARY Hereinabove, the embodiment of the disclosure has been described by using the exemplary embodiment. However, the disclosure is not limited to the exemplary embodiment and it is a matter of course that various embodiments can be made without departing from the spirit of the disclosure.

The disclosure can be used in electrified vehicle manufacturing industry or the like.

What is claimed is:

1. An electrified vehicle comprising:
    an electric motor configured to output motive power for traveling;
    a drive circuit configured to drive the electric motor;
    an electric storage device;
    a system main relay attached to an electric power line for motive power through which the electric storage device and the drive circuit are connected to each other;
    a vehicle-side connection portion configured to be connected to a station-side connection portion of a direct current charging station outside the electrified vehicle;
    a charging relay attached to a charging electric power line through which a portion of the electric power line for motive power positioned between the system main relay and the drive circuit and the vehicle-side connection portion are connected to each other;
    and a control device configured to control the system main relay and the charging relay, wherein,
    when the vehicle-side connection portion and the station-side connection portion are disconnected from each other while the control device determines that a charging of the electric storage device is being charged with by electric power from the direct current charging station is not finished normally, the control device turns the charging relay off with the system main relay being in a turned-on state to perform a diagnosis of double-pole welding abnormality of the charging relay and turns the system main relay off after the diagnosis.

2. The electrified vehicle according to claim 1, wherein the control device performs the diagnosis of the double-pole welding abnormality of the charging relay by using a voltage of a portion of the charging electric power line positioned between the charging relay and the vehicle-side connection portion.

* * * * *